(12) United States Patent
Schneider

(10) Patent No.: US 7,023,380 B2
(45) Date of Patent: Apr. 4, 2006

(54) RF ATTITUDE MEASUREMENT SYSTEM AND METHOD

(75) Inventor: Arthur J. Schneider, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 195 days.

(21) Appl. No.: 10/783,198

(22) Filed: Feb. 20, 2004

(65) Prior Publication Data

US 2005/0184192 A1   Aug. 25, 2005

(51) Int. Cl.
  *H01Q 21/06* (2006.01)
  *G01S 13/00* (2006.01)
  *G01S 5/04* (2006.01)
  *F41G 7/00* (2006.01)

(52) U.S. Cl. ............... 342/361; 244/3.11; 244/3.14; 342/62; 342/442

(58) Field of Classification Search ............ 342/361, 342/442, 62; 244/3.11, 3.14
See application file for complete search history.

(56) References Cited

U.S. PATENT DOCUMENTS

| | | | |
|---|---|---|---|
| 3,137,851 A * | 6/1964 | Kirby et al. ............... | 342/156 |
| 3,215,368 A * | 11/1965 | Follin, Jr. et al. ........ | 244/3.11 |
| 4,168,524 A | 9/1979 | Soltz et al. | |
| 4,754,280 A | 6/1988 | Brown et al. | |
| 5,109,346 A | 4/1992 | Wertz | |
| 5,546,300 A | 8/1996 | Lee et al. | |
| 6,016,990 A | 1/2000 | Small | |
| 2002/0140606 A1 * | 10/2002 | Davis et al. ............... | 342/442 |

* cited by examiner

*Primary Examiner*—Thomas H. Tarcza
*Assistant Examiner*—Fred H Mull
(74) *Attorney, Agent, or Firm*—Thomas J. Finn; Leonard A. Alkov; Karl A. Vick

(57) ABSTRACT

A simple RF system tracks a missile, bullet or artillery round and determines the instantaneous attitude of the spinning projectile while in flight. The system is particularly useful in command-guided weapons systems where line-of-sight is maintained from the launch platform to the target. The system includes a first pair of linearly polarized transmit antennas spaced apart on the projectile for transmitting a signal and a harmonic of that signal. A receiver on the launch platform determines the roll angle and either the yaw or pitch angle from the received signals. To determine the remaining angle, either the receiver samples the received signals ninety degrees out of phase or a second pair of transmit antennas are mounted on the projectile, preferably ninety degrees from the first pair, for transmitting another pair of harmonic signals.

30 Claims, 7 Drawing Sheets

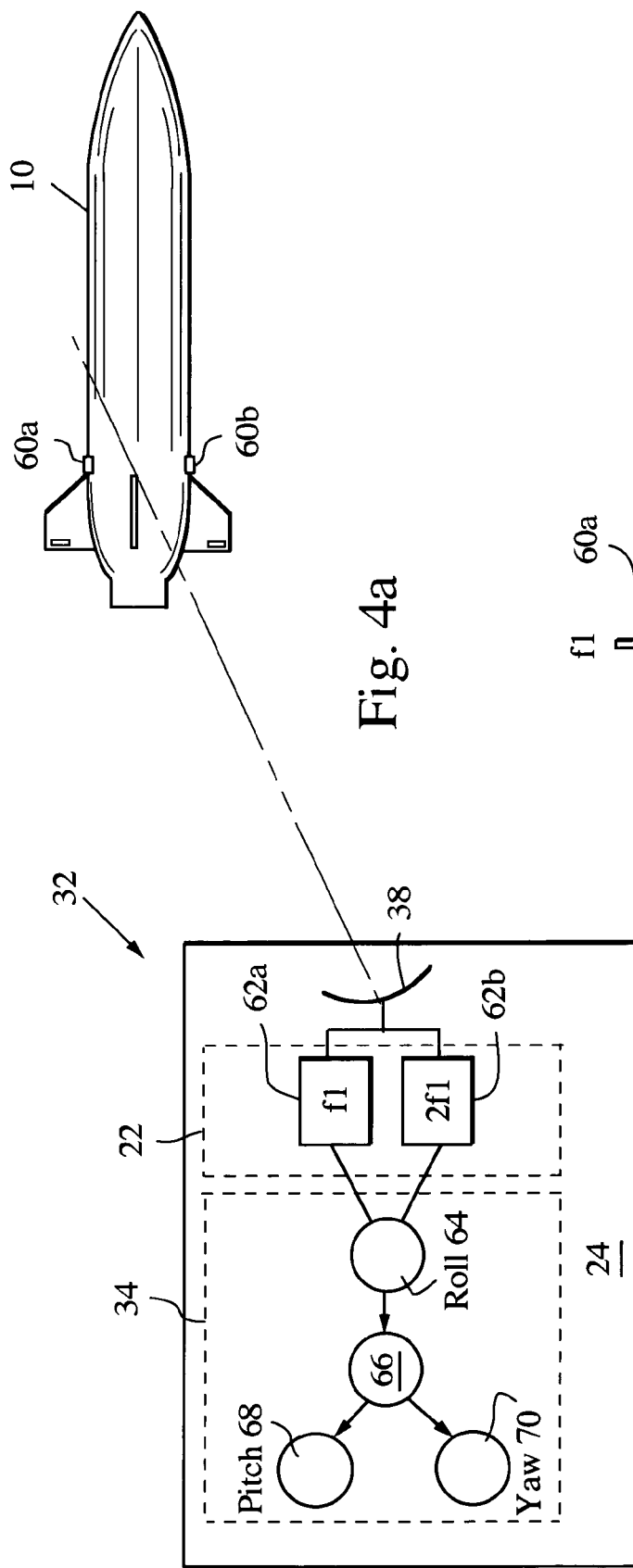

US 7,023,380 B2

RF ATTITUDE MEASUREMENT SYSTEM AND METHOD

BACKGROUND OF THE INVENTION

1. Field of the Invention

This invention relates to techniques for tracking a spinning projectile or missile and determining its instantaneous attitude while in flight.

2. Description of the Related Art

The purpose of this invention is to provide instantaneous attitude measurements for spinning command-guided projectiles such as gun-fired projectiles, EKVs and certain classes of tactical missiles. Such projectiles can be very low cost, since they do not require seekers or complex on-board computers for processing seeker information or GPS receivers and on-board computers. Furthermore, a spinning projectile needs only a single deflection thruster to maneuver in any direction and correct the attitude of the missile since the thruster can be fired at any appropriate roll angle. In operation, a projectile is launched and tracked during flight toward a predesignated target. When it is determined that accumulating errors will cause a miss, a single-shot thruster may be fired late in the flight to correct the trajectory errors. Alternately, canards may be deployed to correct for either cross-range or downrange trajectory errors. These command guided projectiles are much less expensive then either the seeker-guided or GPS-guided systems.

Generally, an on-board inertial measurement unit (IMU) is employed in seeker, GPS and command guided systems to measure attitude; yaw, pitch and roll. IMUs typically consist of three gyroscopes to detect rotation about three mutually orthogonal axes, as well as accelerometers to detect acceleration upon three mutually independent axes. IMUs are expensive, currently ranging from $5,000 to $10,000 per projectile and are not able to survive acceleration in excess of 12,000 g's. This price point is too high for the less expensive gun-fired munitions. Furthermore, next generation systems will generate in excess of 12,000 g's as the range of the weapons continues to increase.

There remains a need for an inexpensive system that is capable of replacing IMUs for command guided weapons systems.

SUMMARY OF THE INVENTION

The present invention is a significant simplification over the convention IMU and will find particular application in the sub-class of command-guide projectiles that maintain line-of-site from the launch platform to, or nearly to, the target. The RF attitude measurement system employs a simple CW radio transmitter carried on the projectile and a simple receiver processor at the launch platform to process the data necessary for determining the attitude of the spinning projectile.

In one embodiment, a transmit system mounted on the projectile includes first and second linearly polarized transmit antennas spaced apart by a distance d' on the projectile and third and fourth transmit antennas spaced apart by a distance d" on the projectile. The first and second transmitters are coupled to the first and second transmit antennas for transmitting first and second transmit signals in phase coherency at first and second different frequencies. Third and fourth transmitters are coupled to the third and fourth transmit antennas for transmitting third and fourth transmit signals in phase coherency at third and fourth different frequencies. A receiver system located on the projectile's launch platform includes a linearly polarized receive antenna system and receiver sections for receiving and downconverting the first, second, third and fourth transmit signals to provide first, second, third and fourth receiver signals. A processor responsive to the first, second, third and fourth receiver signals calculates a roll angle, a pitch angle and a yaw angle.

In another embodiment, a transmit system mounted on the projectile includes first and second linearly polarized transmit antennas spaced apart by a distance d on the projectile, a first transmitter coupled to the first antenna for transmitting a first transmit signal at a first frequency, a second transmitter coupled to the second antenna for transmitting a second transmit signal at a second frequency, wherein the first frequency is different from the second frequency, and the first transmit signal and the second transmit signal are in phase coherency. A receiver system located on the projectile's launch platform includes a linearly polarized receive antenna system for receiving the first transmit signal and the second transmit signal, a first receiver section for receiving and downconverting the first transmit signal to provide a first receiver signal, and a second receiver section for receiving and downconverting the second transmit signal to provide a second receiver signal. A sampler samples the first and second receiver signals approximately ninety degrees out of phase to provide third and fourth receiver signals. A processor responsive to the first, second, third and fourth receiver signals calculates a roll angle, a pitch angle and a yaw angle.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a and 4b are diagrams of a second embodiment of an RF attitude measurement system for command-guided projectiles in accordance with the present invention;

DETAILED DESCRIPTION OF THE INVENTION

This invention provides a simple RF system for tracking a missile, bullet or artillery round and determining the instantaneous attitude of the spinning projectile while it is in flight. The system is particularly useful in command-guided weapons systems where line-of-sight is maintained from the launch platform to the target. By measuring the attitude of spinning projectiles very accurately and knowing the range, a single-shot thruster can be fired at a time calculated to permit correction to a projectile's trajectory, thus allowing accurate targeting on tactical targets. Alternately, canards may be deployed to correct for either crossrange or downrange trajectory errors. The system utilizes, in an exemplary embodiment, a simple cw (continuous wave) radio transmitter carried on the projectile, and a simple receiver and processor in the launch and control platform to process the data necessary for determining the appropriate time to fire the thruster. The thruster is then commanded to fire or the canards to deploy by transmitting a brief signal from the control site to a command receiver onboard the projectile. Control is maintained as long as line of sight between the launch platform and missile exists, preferably all the way to the target.

Figure 1:
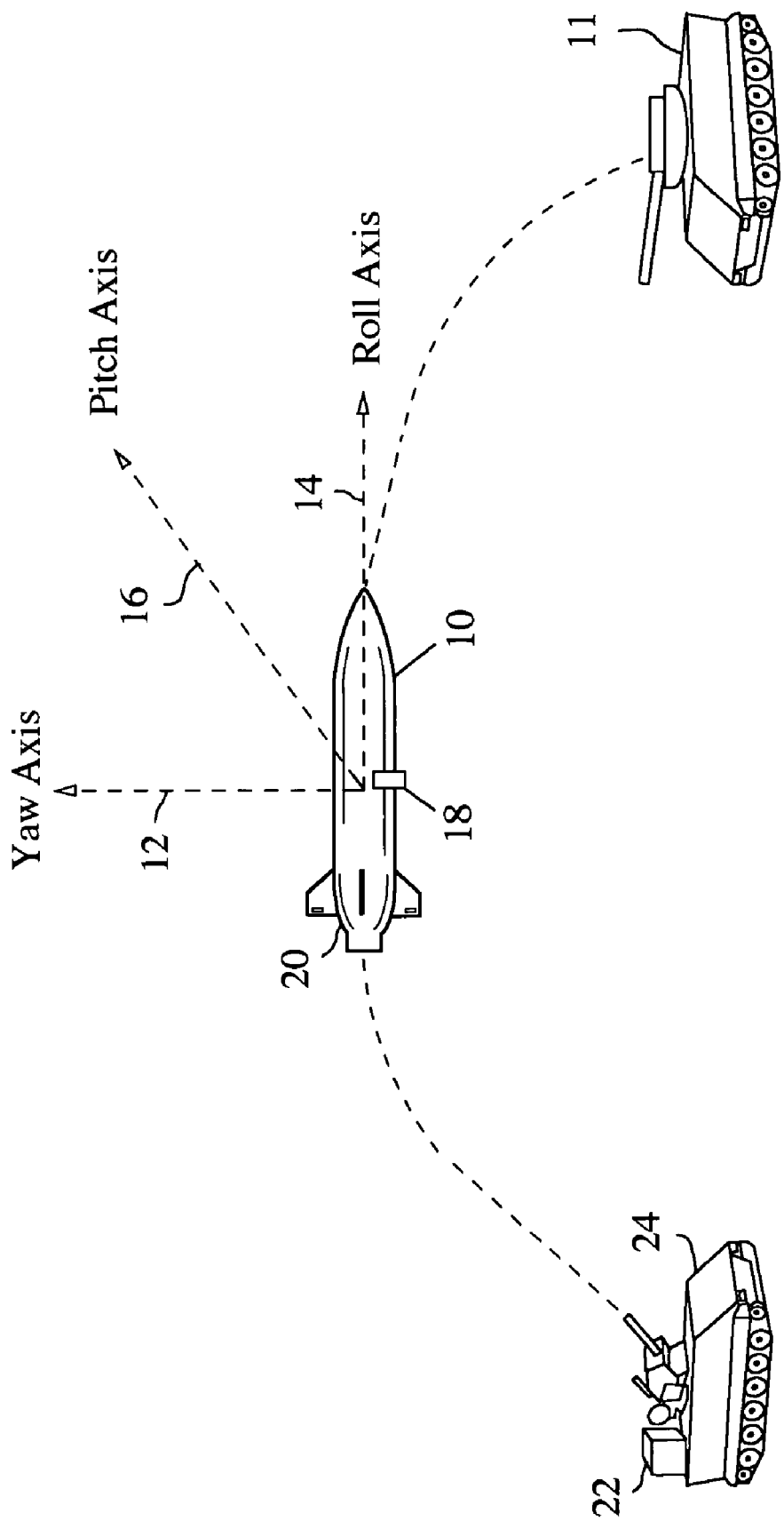
FIG. 1 is a view of an inertial coordinate system illustrating the attitude measurements of yaw, pitch and roll.

Referring to FIG. 1, a projectile, EKV or missile (referred to hereinafter as missile 10) is shown in flight towards a target 11. Three mutually orthogonal axes, labeled yaw axis 12, roll axis 14, and pitch axis 16, define a missile frame of reference. The yaw axis 12 is coincident with the boresight of the missile 10. The roll axis 14 is tangential to the flight path in which the missile 10 travels and the pitch axis 16 is orthogonal to the plane of the flight path. More particularly, attitude refers to the angular orientation of the missile with respect to three orthogonal reference axes. The sensed attitude represents missile angular orientation relative to the missile frame of reference defined by the yaw axis 12, the roll axis 14, and the pitch axis 16. It is generally desirable to know the attitude of the missile 10 with respect to an earth frame of reference, by means of a direction cosine matrix which embodies the relation between the missile and the earth reference frame.

The missile 10 includes a flight control mechanism 18 such as one or more thrusters or canards and a radio transmitter 20 that transmits signals 25. A receiver and control unit 22 on the launch platform 24 receives signals 25 transmitted from the projectile and downconverts them into receiver signals 35, measures the attitude of the projectile, and issues a transmitted command signal 37 to deploy the flight control mechanism 18 at the appropriate time. Control is maintained as long as line of sight between the launch platform and missile exists, preferably all the way to the target. If line of sight is broken, the missile continues on its ballistic trajectory to the target.

Figure 2:
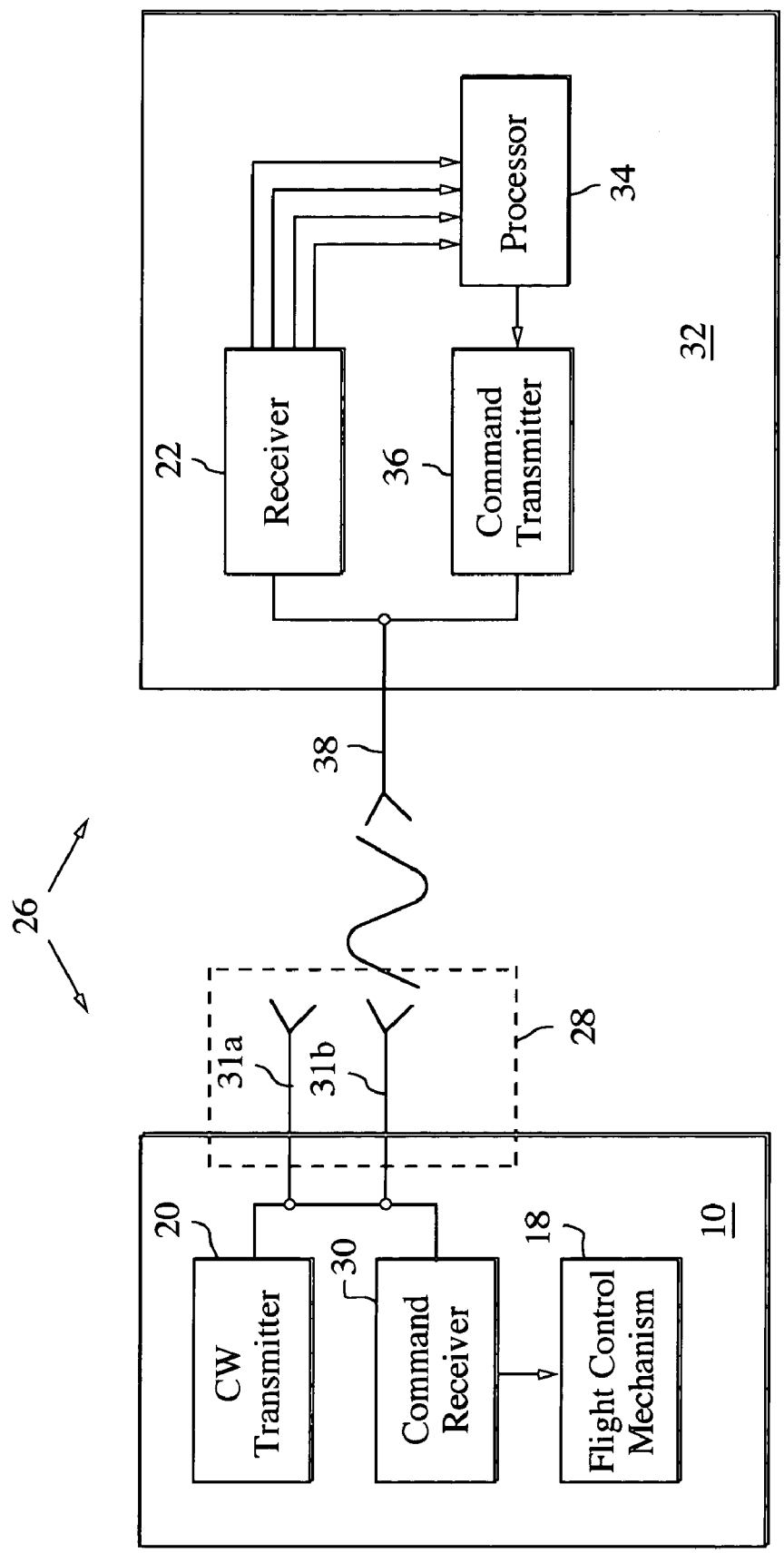
FIG. 2 is a simplified schematic block diagram of a command-guided projectile control system.

As shown in FIG. 2, a projectile control system 26 includes on-board projectile 10 the flight control mechanism 18, the cw radio transmitter 20, an antenna system 28, and command receiver 30. Antenna system 28 includes at least one pair of antennas 31a and 31b that are spaced apart by a distance d. The transmitter 20 and the receiver 30 share the antenna system 28 in this exemplary embodiment, although separate transmit and receive antennas can be employed in other embodiments. A flight control site 32 at the launch platform includes the receiver 22 and a processor 34 responsive to a first and perhaps a second pair of output signals from the two (or four) receiver sections as in FIGS. 4a and 3a for calculating the instantaneous attitude of the projectile 10. A command transmitter 36 is responsive to control signals generated by the processor for transmitting commands to the projectile to control the flight control mechanism. An antenna system 38 is shared by the receiver 22 and the command transmitter 36, although in an alternate embodiment, separate antennas can be employed for separate receive and transmit functions. Antenna system 38 suitably tracks missile 10 in flight to maintain line of sight.

Figure 3A:
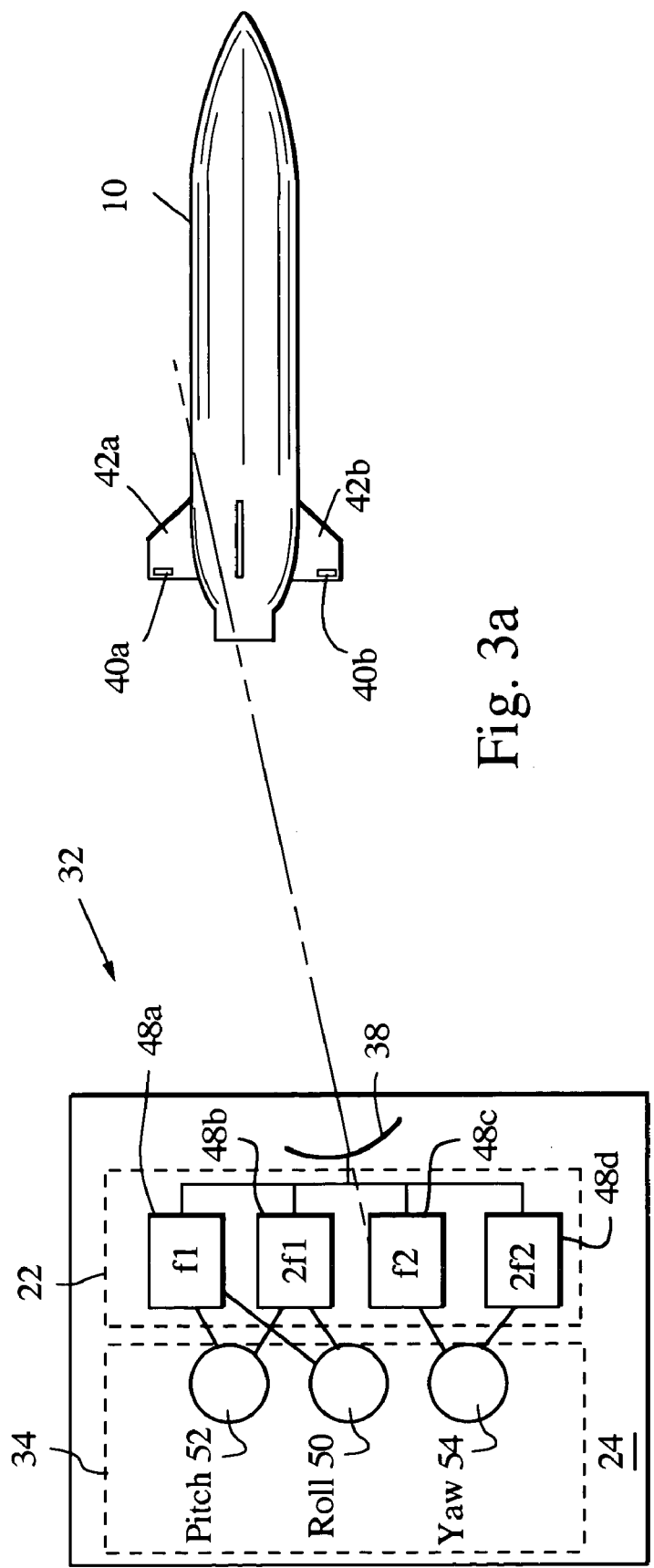
FIGS. 3a and 3b are diagrams of a first embodiment of an RF attitude measurement system for command-guided projectiles in accordance with the present invention.
Figure 3B:
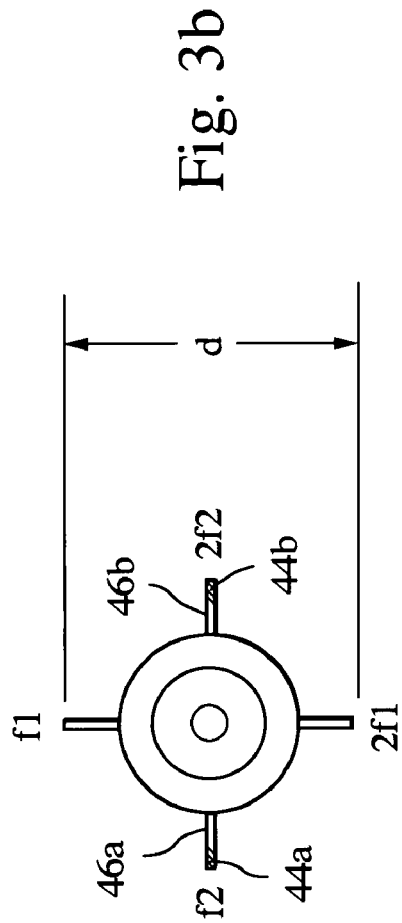

As shown in FIGS. 3a and 3b, one embodiment of the flight control system 26 includes a first pair of antennas 40a and 40b mounted on fins 42a and 42b on opposite sides of the missile 10 a distance d' apart and a second pair of antennas 44a and 44b mounted on fins 46a and 46b on opposite sides of the missile 10 a distance d", suitably a right angles to the first pair. The distances d' and d" are suitably but not necessarily the same, hereinafter referred to simply as d. Placement of the antennas on the fins is not necessary but is useful to make d as large as possible. At least one pair must be linearly polarized antennas in order to measure roll angle. The first pair transmit at frequencies f1 and a phase locked N*f1 where N=2, 3, 4 . . . but most typically 2. The second pair transmit at frequencies f2 and a phase locked M*f2 where M=2, 3, 4 . . . but most typically 2.

At the flight control site 32 on launch platform 24, antenna 38 tracks the missile to maintain line of site and receive transmissions f1, 2f1, f2 and 2f2. Receiver 22 includes four receiver sections 48a, 48b, 48c and 48d for receiving, amplifying and downmixing f1, 2f1, f2 and 2f2 to generate respective output signals. Processor 34 sums the output signals from the linearly polarized transmit antennas and calculates the instantaneous roll 50. The processor then analyzes the phase differences between f1/2f1 and f2/2f2 and compensates for the roll to calculate the pitch 52 and yaw 54.

As shown in FIGS. 4a and 4b, another embodiment of the flight control system 26 includes a one pair of linearly polarized antennas 60a and 60b mounted on opposite sides of the missile 10 a distance d apart. The pair transmit at frequencies f1 and a phase locked N*f1 where N=2, 3, 4 . . . but most typically 2. At the flight control site 32 on launch platform 24, antenna 38 tracks the missile to maintain line of site and receive transmissions f1, 2f1. Receiver 22 includes two receiver sections 62a, 62b for receiving, amplifying and downmixing f1 and 2f1 to generate respective output signals. Processor 34 sums the output signals from the linearly polarized transmit antennas and calculates the instantaneous roll 64 and spin rate. A sampler 66 samples the output signals in accordance with the spin rate to generate sampled output signals f1/2f1 and f1'/2f1' that are ninety-degrees out of phase. In effect, f1'/2f1' take the place of f2/2f2 without requiring the extra transmitter pair on the missile and extra receiver pair on the launch platform. Processor 34 then analyzes the phase differences between f1/2f1 and f1'/2f1' and compensates for the roll to calculate the pitch 68 and yaw 70.

Figure 5:
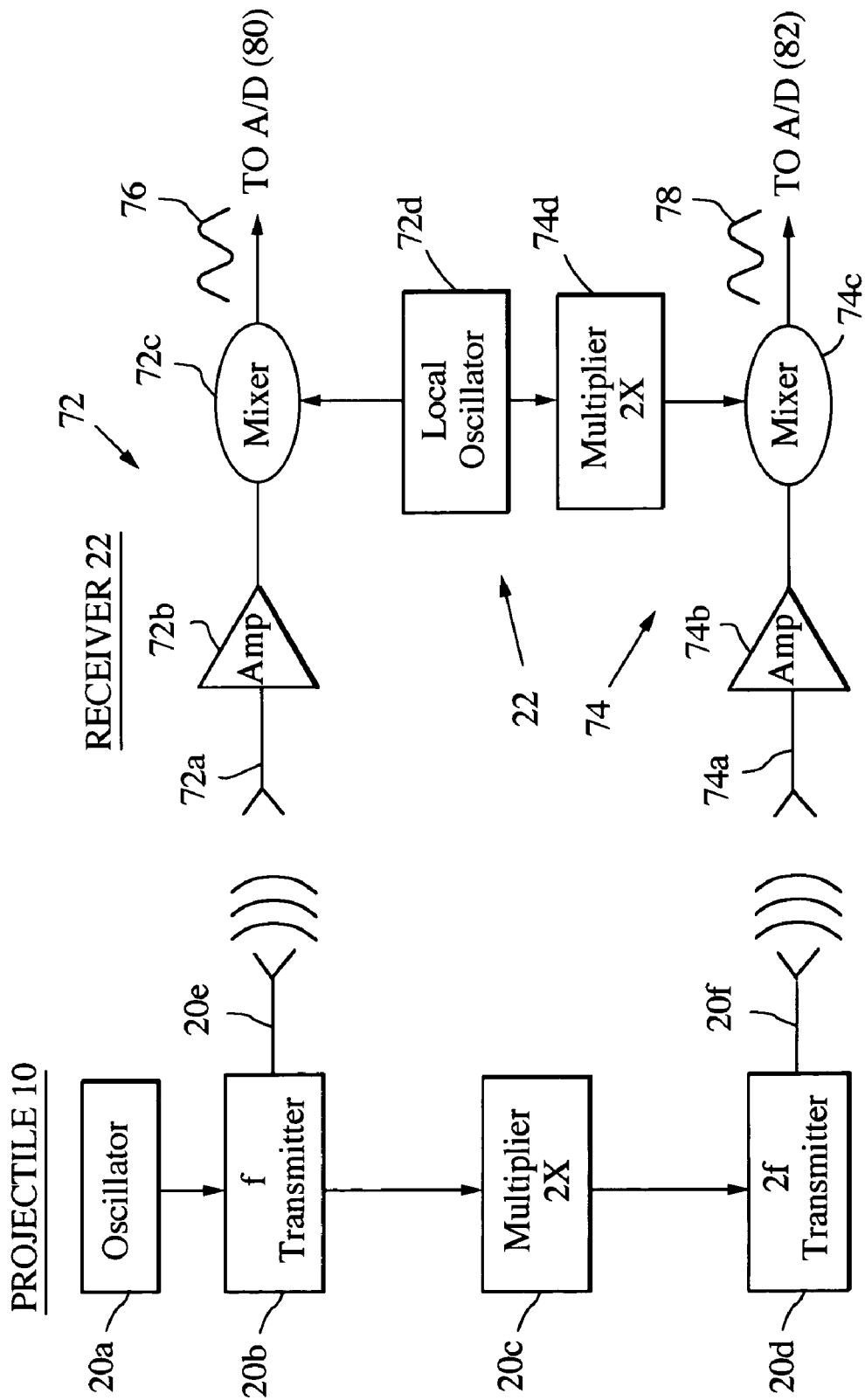
FIG. 5 is a simplified block diagram of on-board transmitter and platform receiver for the attitude measurement system.

A more detailed illustration of one transmitter/receiver pair in the flight control system is shown in FIG. 5. The projectile cw transmitter 20 includes an oscillator 20a which generates a signal at frequency f1, and a first transmitter 20b for transmitting a first signal at frequency 1 f. In an exemplary embodiment, f1 is 10 GHz. The transmitter unit 20 further includes a frequency multiplier 20c for multiplying the frequency of the oscillator signal, to produce a signal at 2f1. A second transmitter 20d transmits a second transmitter signal at frequency 2f1, in this example 20 GHz. The transmitters 20b and 20d use a linearly polarized antenna to radiate the transmitted signals.

The receiver unit 22 is positioned at or on the projectile launch and control platform, and includes two receiver sections 72, 74 for respectively receiving the two wireless signals transmitted by the projectile transmitters. While the receiver unit is illustrated in FIG. 5 as including two antennas 72a, 74a, in a preferred embodiment, the receiver sections will share a common linearly polarized tracking antenna. The first receiver section 72 includes linearly polarized antenna 72a, which receives the first transmitted signal at frequency f1. The received signal is amplified by amplifier 72b, and the amplified signal is mixed at mixer 72c with a local oscillator (LO) signal generated by LO 72d. The LO signal in this exemplary embodiment is 10 GHz plus 1 KHz, producing a mixer output signal at 1 KHz, which is provided to the processor.

Figure 6:
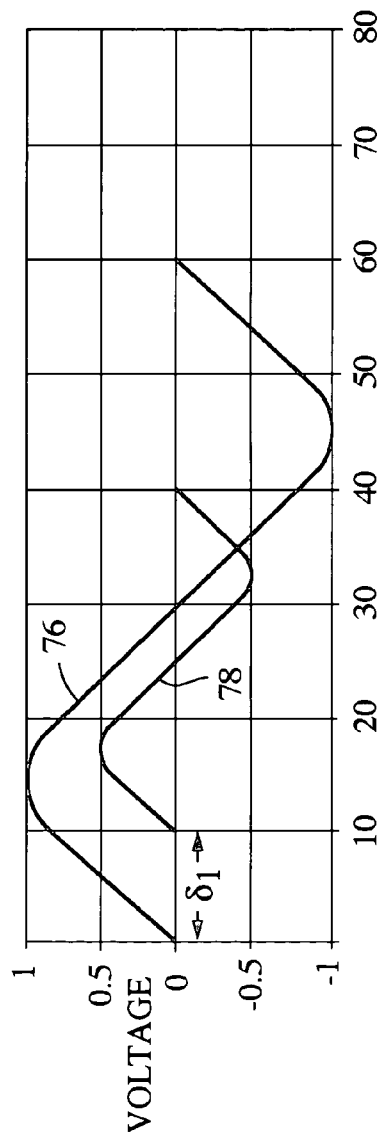
FIG. 6 shows the respective voltage waveforms of the first and second receiver signals provided by the receiver of FIG. 5.

The second receiver unit 74 receives the second transmitted signal with linearly polarized antenna 74a at frequency 2f1, which is amplified by amplifier 74b and mixed at mixer 74c with a signal produced by multiplying the LO signal by two at multiplier 74d, i.e. by a signal at frequency 20 GHz plus 2 KHz. The output of the mixer 74c is therefore a 2 KHz signal. The output of the mixer 74c is also provided to the processor. The two output signals 76 and 78, which are out of phase to reflect a given yaw or pitch angle, are shown in FIG. 6.

The receiver sections 72, 74 are conventional heterodyne receivers. The two output signals are replicas of the two received radio frequency signals in amplitude and phase, but the carrier frequencies have been shifted down from tens of GHz to a few KHz. If the receiver LO frequency drifts or if there are significant doppler shifts due to the fast moving projectile, these output frequencies may differ from 1 KHz and 2 KHz. Note however, that whatever the frequency of these two output signals, the two frequencies will always differ by exactly a factor of 2 (more generally N) and they will always have a definite relative phase relationship between them. This relationship is true because the two transmitted frequencies are derived from a common master oscillator 20a at the projectile cw transmitter 20 and the two receiver mixer injection signals are derived from a common Local Oscillator 72d at the receiver unit 22.

Figure 7:
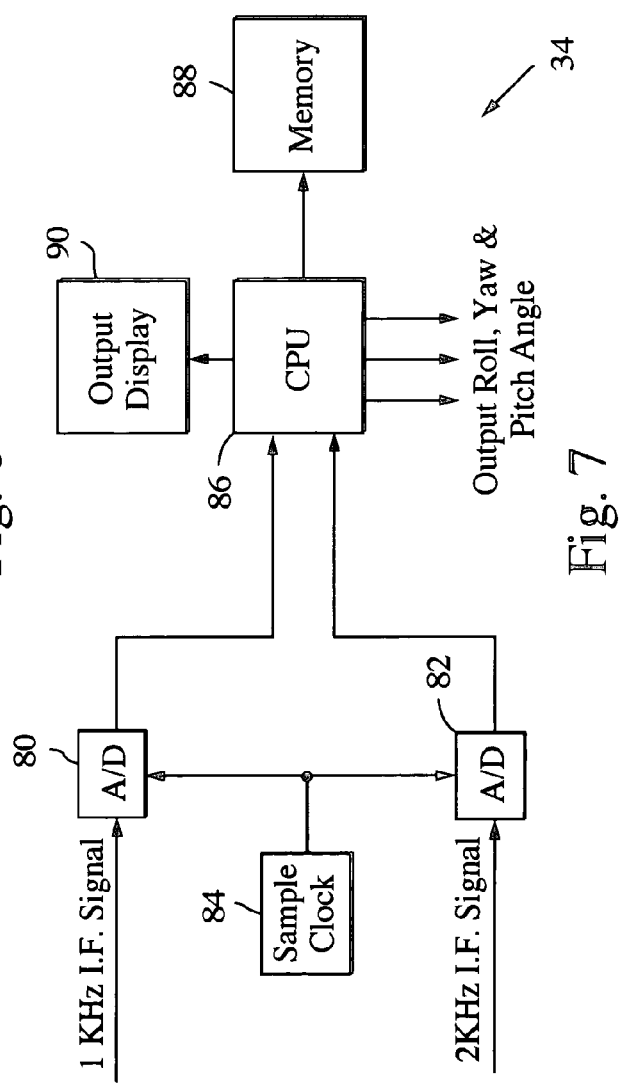
FIG. 7 is a schematic block diagram of a digital signal processor for processing the receiver signals of the system of FIG. 5.

An exemplary digital processor 34 is illustrated in schematic block diagram form in FIG. 7. The 1 KHz and 2 KHz I.F. signals are converted to digital form by respective analog-to-digital (A/D) converters 80 and 82, driven by a sample clock 84, e.g. at 10 KHz, and the digitized signals are input to a central processing unit (CPU) 86. The CPU can be a microcomputer, interfacing with a memory 88 in which is stored program instructions and data. The CPU processes the incoming signals, and provides as an output the roll angle, yaw angle and pitch angle measurements. An optional display 90 can display the angle measurements, if desired for a particular application. Kalman filter and phase-locked-loop functions are implemented as programs (resident in the memory 88) which operate on the data stream provided by the analog-to-digital converters.

Figure 8A:
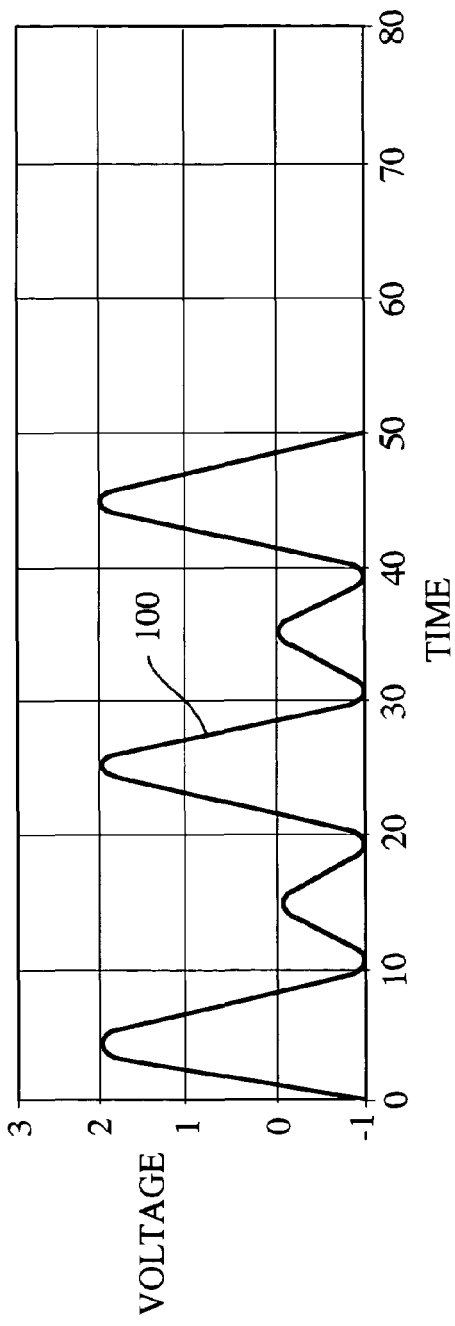
FIGS. 8a and 8b shows the summed voltage (non-inverted and inverted) of the voltage waveforms in FIG. 7.

To first calculate the instantaneous roll angle, the output signals 76 and 78 from the first and second receiver sections 72, 74 are summed by processor 34. When the two output signals are summed, they produce a beating waveform 100 as shown in FIG. 8a. If the frequencies differ from 1 KHz and 2 KHz, this repeating waveform will still have the same shape. It will simply repeat at a different rate. Note that the waveform is asymmetric in amplitude. There is a large positive amplitude, shown here as 2 volts, followed by a smaller negative amplitude, shown here as −1 volt. This two-frequency waveform is the simplest example of a repeating nonsymmetric waveform. More complicated non-symmetric waveforms can be employed, such as repeating single-cycle impulse waveforms described in U.S. Pat. Nos. 5,146,616 and 5,239,309; but the two frequency case is simple and adequate for many applications.

Now consider what happens when the projectile 10 rotates during its flight. The linearly polarized transmitting antenna 20e or 20f will periodically become cross polarized with the fixed receiving antenna 72a or 74a. The result is that the received signal strength in both receiver sections 72 and 74 will be decreased from its maximum value. At a roll angle of 90 degrees, the polarization will be completely orthogonal to the receiver and no signal will be received for a brief period.

At a roll angle of 180 degrees, the received signals will once again be at maximum strength. However, each signal will be inverted in voltage with respect to the signal received at zero roll angle. Normally, a receiver could not detect such a difference. Each receiver is receiving a simple sinusoidal signal which produces electrical currents in the receiving antenna which alternate symmetrically between positive (+) voltage and negative (−) voltage at a rate of 100 MHz or 200 MHz.

Figure 8B:
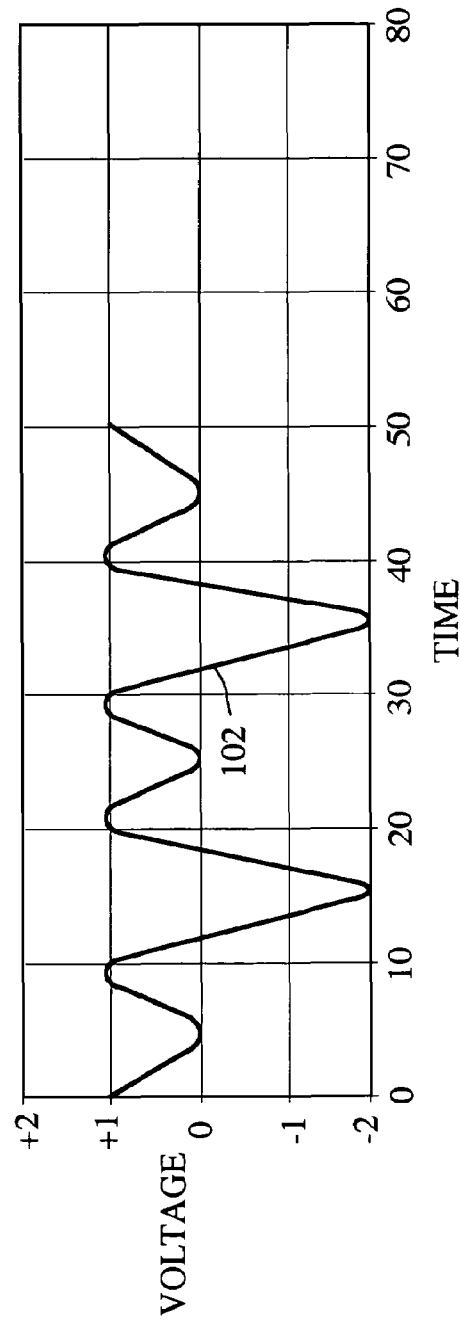

If the output signals from the receivers are inverted the summed voltage 102 shown in FIG. 8B is inverted positive-to-negative and the resulting asymmetric waveform also inverts positive to negative. When the transmitting antenna rotates 180 degrees, the summed receiver output voltage 102 will also be inverted. The maximum voltage will now be −2 volts. By comparing the largest positive and largest negative voltage excursions in the summed signal, it is possible to detect whether the projectile roll angle has exceeded 90 degrees. In effect, the lower transmitted frequency acts as a pilot wave for phase information for the 2-times high frequency and removes the 180 degree ambiguity in the polarization of a rotating antenna.

There are various ways to process the receiver signals to extract the projectile roll angle as described in U.S. Pat. No. 6,016,990, which is hereby incorporated by reference. As described in a first embodiment therein, the received signal in each receiver section (10 GHz and 20 GHz) varies in amplitude as the projectile rotates. Twice per rotation, the received signal goes to zero when the transmitted polarization is orthogonal to the receiving antenna polarization. These zeroes in received signal strength occur periodically at half the rotation period of the projectile. A Kalman filter or a phase-locked-loop is used to track these periodic zeroes and interpolate the rotation angle four times between zero crossings. The asymmetric summed signal is tested once or twice each rotation period and used to initialize the tracking filter to remove the 180 degree roll ambiguity. The various tracking filters, summing of the receiver signals, and tests of voltage polarity can be implemented as software routines in the processor 34.

Figure 9A:
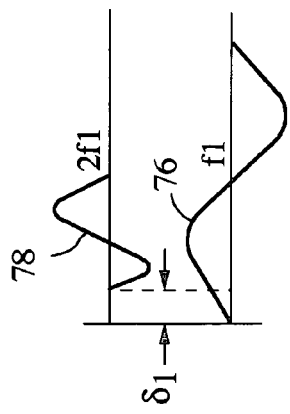
FIGS. 9a and 9b are phase plots illustrating the measurement of yaw and pitch.
Figure 9B:
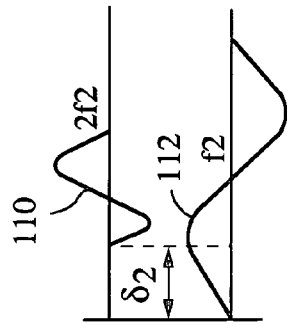

To calculate the yaw and pitch angle, the processor 34 first determines the phase shift $\delta1$ between output signals 76 and 78, f1 and 2f1, respectively, from the first and second receiver sections 72, 74 as shown in FIG. 9a and phase shift $\delta2$ between output signals 110 and 112, which either represent f1/2f2 or f1/2f1 sampled ninety degrees out of phase as shown in FIG. 9b. Next, the processor computes the yaw and pitch angles $\Theta_1$ and $\Theta_2$, respectively, in the missile coordinate system as:

$\Theta_1 = \sin^{-1}(\delta1 * c/d)$, and $\Theta_2 = \sin^{-1}(\delta2 * c/d)$ Where c is the speed of light and d is the separation of the transmission antennas on the spinning projectile.

Finally, the processor computes the yaw and pitch angles $\Theta_1'$ and $\Theta_2'$, respectively, in the missile coordinate system as:

$$\Theta_1' = (\delta_1 c/d)\sin(\Theta_3+\pi/4) + (\delta_2 c/d)\cos(\Theta_3+3\pi/4), \text{ and}$$

$$\Theta_2' = (\delta_1 c/d)\cos(\Theta_3+\pi/4) + (\delta_2 c/d)\sin(\Theta_3+3\pi/4)$$

where $\Theta_3$ is the instantaneous roll angle.

While several illustrative embodiments of the invention have been shown and described, numerous variations and alternate embodiments will occur to those skilled in the art. For example, some of the functions performed by the processor such as summing the waveforms, Kalman filtering and the phase locked loop can be implemented with analog circuitry if so desired. Such variations and alternate embodiments are contemplated, and can be made without departing from the spirit and scope of the invention as defined in the appended claims.

I claim:

1. A system for tracking the attitude of a rotating projectile, comprising:
   a transmit system mounted on the projectile, the system including first and second linearly polarized transmit antennas spaced apart by a distance d' on the projectile and third and fourth transmit antennas spaced apart by a distance d" on the projectile, first and second transmitters coupled to the first and second transmit antennas for transmitting first and second transmit signals in phase coherency at first and second different frequencies, third and fourth transmitters coupled to the third and fourth transmit antennas for transmitting third and fourth transmit signals in phase coherency at third and fourth different frequencies;
   a receiver system located on the projectile's launch platform, the receiver system including a linearly polarized receive antenna system and receiver sections for receiving and downconverting said first, second, third and fourth transmit signals to provide first, second, third and fourth receiver signals; and
   a processor responsive to said first, second, third and fourth receiver signals for calculating a roll angle, a pitch angle and a yaw angle.

2. The system of claim 1, further comprising first, second, third and fourth fins on the projectile on which said first, second, third and fourth antennas are mounted.

3. The system of claim 2, wherein said second and fourth frequencies are harmonics of said first and third frequencies, respectively.

4. The system of claim 3, wherein said second and fourth frequencies are second harmonics.

5. The system of claim 1, wherein distances d' and d" are approximately equal.

6. The system of claim 1, wherein the linearly polarized receive antenna system tracks the projectile from launch to maintain a line-of-site until at or near an intended target.

7. The system of claim 1, wherein said processor measures phase shifts between said first and second receiver signals and said third and fourth receiver signals to calculate the yaw and pitch angles.

8. The system of claim 1, wherein said processor calculates the roll angle, calculates the yaw and pitch angles in a missile frame of reference and then uses the roll angle to calculate the yaw and pitch angles in an earth frame of reference.

9. The system of claim 8, wherein said processor measures phase shifts between said first and second receiver signals and said third and fourth receiver signals to calculate the yaw and pitch angles in the missile frame of reference.

10. A system for tracking the attitude of a rotating projectile, comprising:
    a transmit system mounted on the projectile, the system including first and second linearly polarized transmit antennas spaced apart by a distance d on the projectile, a first transmitter coupled to the first antenna for transmitting a first transmit signal at a first frequency, a second transmitter coupled to the second antenna for transmitting a second transmit signal at a second frequency, wherein said first frequency is different from said second frequency, and said first transmit signal and said second transmit signal are in phase coherency;
    a receiver system located on the projectile's launch platform, the receiver system including a linearly polarized receive antenna system for receiving said first transmit signal and said second transmit signal, a first receiver section for receiving and downconverting said first transmit signal to provide a first receiver signal, and a second receiver section for receiving and downconverting said second transmit signal to provide a second receiver signal;
    a sampler that samples the first and second receiver signals approximately ninety degrees out of phase to provide third and fourth receiver signals; and
    a processor responsive to said first, second, third and fourth receiver signals for calculating a roll angle, a pitch angle and a yaw angle.

11. The system of claim 10, wherein the processor first calculates the roll angle and a spin rate from said first and second receiver signals, said sampler sampling the first and second receiver signals at a sampling period determined by the spin rate so that said third and fourth receiver signals are approximately ninety degrees out of phase.

12. The system of claim 11, wherein the processor then calculates the yaw and pitch angles in a missile frame of reference and then uses the roll angle to calculate the yaw and pitch angles in an earth frame of reference.

13. The system of claim 12, wherein said processor measures phase shifts between said first and second receiver signals and said third and fourth receiver signals to calculate the yaw and pitch angles in the missile frame of reference.

14. The system of claim 10, wherein the second frequency is a harmonic of the first frequency.

15. The system of claim 10, further comprising first and second fins on the projectile on which said first and second transmit antennas are mounted.

16. A system for controlling a rotating projectile launched from a platform onto a target, comprising:
    A launch platform for launching a rotating projectile towards a target, said platform comprising a tracking antenna for tracking the projectile to maintain a line of sight;
    a projectile having a flight control mechanism mounted thereon, and a command receiver for controlling deployment of the flight control mechanism in response to command signals;
    a transmit system mounted on the projectile, the system including first and second linearly polarized transmit antennas spaced apart by a distance d' on the projectile and third and fourth transmit antennas spaced apart by a distance d" on the projectile, first and second transmitters coupled to the first and second transmit antennas for transmitting first and second transmit signals in phase coherency at first and second different frequencies, third and fourth transmitters coupled to the third and fourth transmit antennas for transmitting third and fourth transmit signals in phase coherency at third and fourth different frequencies;

a receiver system located on the launch platform, the receiver system including a linearly polarized receive antenna system and receiver sections for receiving and downconverting said first, second, third and fourth transmit signals to provide first, second, third and fourth receiver signals; and a flight controller responsive to said receiver system for controlling the projectile in flight, the flight controller adapted to calculate a roll angle, a yaw angle and a pitch angle of said projectile while in flight from said first, second, third and fourth receiver signals and generate a command signal at an appropriate time in dependence on said roll, yaw and pitch angles, said flight controller further including a command transmitter for transmitting said command signal to said projectile.

17. The system of claim 16, wherein said flight controller calculates the roll angle, calculates the yaw and pitch angles in a missile frame of reference and then uses the roll angle to calculate the yaw and pitch angles in an earth frame of reference.

18. The system of claim 16, wherein said flight controller measures phase shifts between said first and second receiver signals and said third and fourth receiver signals to calculate the yaw and pitch angles in the missile frame of reference.

19. A system for controlling a rotating projectile launched from a platform onto a target, comprising:
    A launch platform for launching a rotating projectile towards a target, said platform comprising a tracking antenna for tracking the projectile to maintain a line of sight;
    a projectile having a flight control mechanism mounted thereon, and a command receiver for controlling deployment of the flight control mechanism in response to command signals;
    a transmit system mounted on the projectile, the system including first and second linearly polarized transmit antennas spaced apart by a distance d on the projectile, a first transmitter coupled to the first antenna for transmitting a first transmit signal at a first frequency, a second transmitter coupled to the second antenna for transmitting a second transmit signal at a second frequency, wherein said first frequency is different from said second frequency, and said first transmit signal and said second transmit signal are in phase coherency;
    a receiver system located on the projectile's launch platform, the receiver system including a linearly polarized receive antenna system for receiving said first transmit signal and said second transmit signal, a first receiver section for receiving and downconverting said first transmit signal to provide a first receiver signal, and a second receiver section for receiving and downconverting said second transmit signal to provide a second receiver signal, and a sampler that samples the first and second receiver signals approximately ninety degrees out of phase to provide third and fourth receiver signals; and
    a flight controller responsive to said receiver system for controlling the projectile in flight, the flight controller adapted to calculate a roll angle, a yaw angle and a pitch angle of said projectile while in flight from said first, second, third and fourth receiver signals and generate a command signal at an appropriate time in dependence on said roll, yaw and pitch angles, said flight controller further including a command transmitter for transmitting said command signal to said projectile.

20. The system of claim 19, wherein the processor first calculates the roll angle and a spin rate from said first and second receiver signals, said sampler sampling the first and second receiver signals at a sampling period determined by the spin rate so that said third and fourth receiver signals are approximately ninety degrees out of phase.

21. The system of claim 20, wherein the processor then calculates the yaw and pitch angles in a missile frame of reference and then uses the roll angle to calculate the yaw and pitch angles in an earth frame of reference.

22. The system of claim 21, wherein said processor measures phase shifts between said first and second receiver signals and said third and fourth receiver signals to calculate the yaw and pitch angles in the missile frame of reference.

23. A method for tracking the attitude of a rotating projectile, comprising:
    transmitting first and second linearly polarized transmit signals in phase coherency at first and second different frequencies from positions spaced apart by a distance d' on the projectile;
    transmitting third and fourth linearly polarized transmit signals in phase coherency at third and fourth different frequencies from positions spaced apart by a distance d" on the projectile;
    receiving and downconverting said first, second, third and fourth transmit signals at the projectile's launch platform to provide first, second, third and fourth receiver signals; and
    processing said first, second, third and fourth receiver signals to calculate a roll angle, a pitch angle and a yaw angle.

24. The method of claim 23, further said first, second, third and fourth signals are transmitted from positions on first, second, third and fourth fins on the projectile, respectively.

25. The method of claim 24, wherein said second and fourth frequencies are second harmonics of said first and third frequencies, respectively.

26. The method of claim 23, wherein distances d' and d" are approximately equal.

27. The method of claim 23, further comprising:
    tracking the projectile from launch to maintain a line-of-site until at or near an intended target.

28. The method of claim 23, wherein the receiver signals are processed to measure phase shifts between said first and second receiver signals and said third and fourth receiver signals to calculate the yaw and pitch angles.

29. The method of claim 23, wherein processing the receiver signals comprising:
    calculating the roll angle
    calculating the yaw and pitch angles in a missile frame of reference; and
    using the roll angle to calculate the yaw and pitch angles in an earth frame of reference.

30. The method of claim 29, wherein the phase shifts between said first and second receiver signals and said third and fourth receiver signals are measured to calculate the yaw and pitch angles in the missile frame of reference.

* * * * *